Patented Dec. 6, 1949

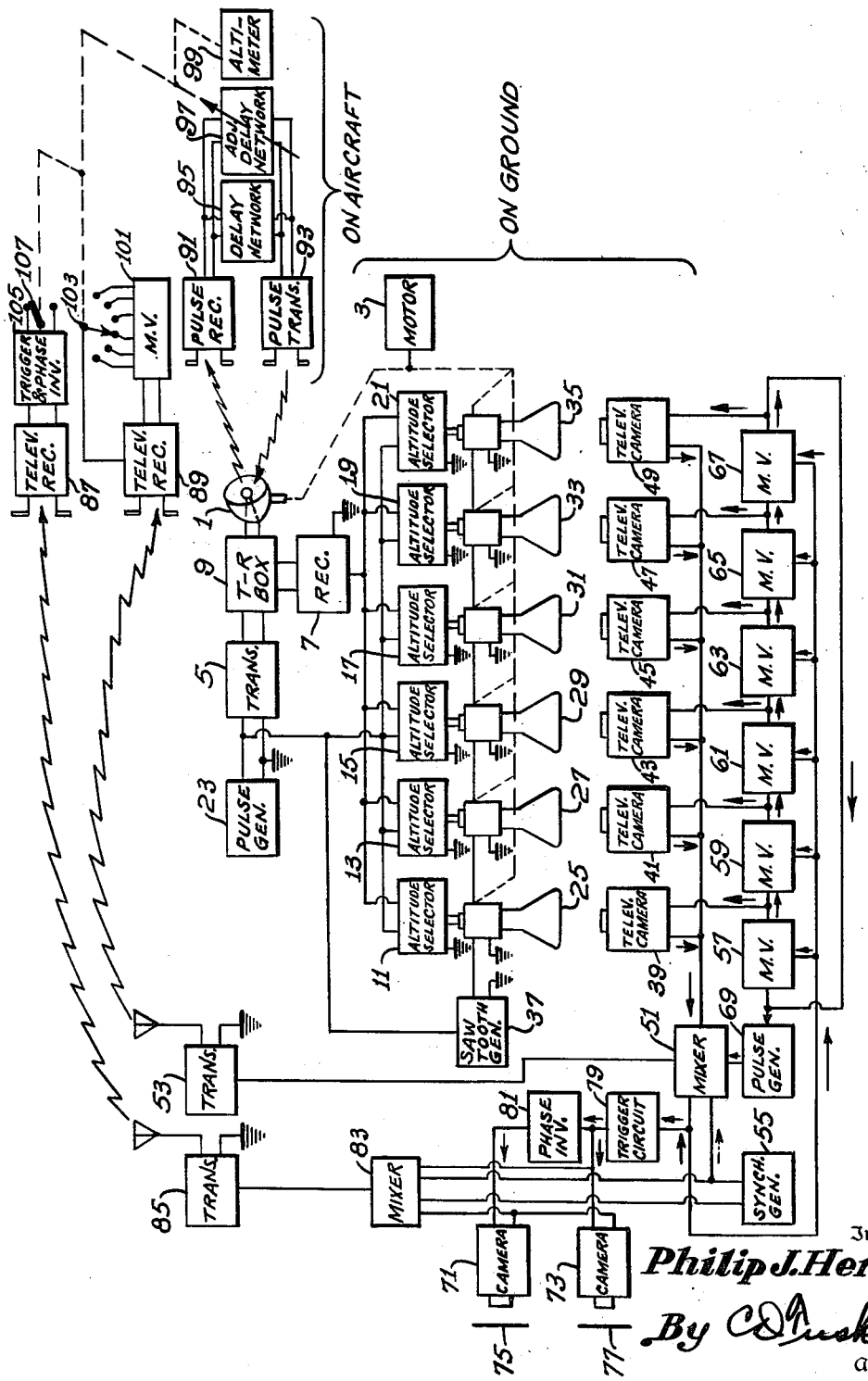

2,490,268

UNITED STATES PATENT OFFICE 2,490,268

TRAFFIC CONTROL SYSTEM

Philip J. Herbst, Princeton, N. J., assignor to Radio Corporation of America, a corporation of Delaware Application January 30, 1947, Serial No. 725,206

5 Claims. (Cl. 343—6)

1

This invention relates to improvements in air navigation systems of the radar-television type, wherein the positions of all aircraft within the service area of a ground based radar station are displayed on a PPI (plan position indicator), a map of the area is superimposed on the radar picture, and the combined display is broadcast for reproduction on all properly equipped aircraft within said area. One such system is described in copending U. S. patent application Serial No. 618,969 filed September 27, 1945 by Philip J. Herbst and entitled Radio navigation system. In the system of said copending application, the space over the service area is separated into a plurality of altitude layers, the PPI indications for the various layers being displayed separately and transmitted on separate channels, so that a television equipped craft will receive indications of the positions of other aircraft only if they are within a predetermined altitude range, for example 1000 feet.

It is necessary for each craft, regardless of its altitude layer, to receive a map in addition to the PPI picture. In the system of said aforementioned copending application, it is proposed to superimpose a separate map on each PPI picture at the ground station. With a reasonably large number of altitude layers, say ten, the total radio frequency band width occupied by the system becomes undesirably large. Another difficulty which arises in the operation of said system is in the interpretation of the composite display which appears on the aircraft. Since the "pips" of the PPI picture and the map are displayed on the same cathode ray tube, there is little visual contrast between the map details and the spots representing positions of various aircraft. The pilot or navigator must watch the display carefully to distinguish between the slowly moving spots or "pips" and the stationary map elements. The resulting fatigue and possibility of error are serious problems.

The principal object of the present invention is to provide, in a system of the described type, methods of and means for producing the required combined display of map and PPI picture in a plurality of channels, corresponding to various altitude layers, without occupying an unduly large portion of the available radio spectrum.

Another major object of this invention is to provide methods of and means for producing combined map and PPI displays wherein the radar "pips" are readily distinguishable from the map details.

2

The foregoing and other objects will become apparent to those skilled in the art upon consideration of the following description with reference to the accompanying drawing, wherein the single figure of the drawing is a schematic diagram of an embodiment of the invention.

In most air operations only two types of terrain information are required. The first is for craft approaching to land or leaving a terminal. The second is for craft flying en route or entering the approach control zone. Thus, assuming that ten altitude layers are used, the maps transmitted to craft in the upper nine layers can be alike, while only the map corresponding to the lowest layer need show details of interest to low flying craft.

In the practice of the present invention, the maps are not superimposed on the radar displays at the ground station, but are transmitted separately, preferably on a time-sharing basis on a single carrier. The radar data may be transmitted on another carrier, also on a time-sharing basis. Superposition of the map and radar indication is obtained on the aircraft by displaying both pictures on a single cathode ray tube. The repetition rate of the map picture is made several times as high as that of the PPI picture. The combined display presents the appearance of a steady map, with superimposed "pips" flickering at a relatively slow rate.

Referring to the drawing, the ground station includes a radar system of the plan position indicator type, comprising a directive antenna 1 continuously rotated in azimuth by a motor 3, a pulse transmitter 5, and a receiver 7. A duplexing circuit or T-R box 9 is provided between the transmitter 5 and the receiver 7 to effectively disconnect the receiver during the transmission of a pulse from the transmitter.

The output of the receiver 7, instead of being applied to a single indicator in the customary manner, goes to a plurality of altitude selector circuits 11, 13, 15, 17, 19 and 21. Each altitude selector circuit is designed to provide a single output pulse in response to two input pulses separated by a predetermined time interval, the required interval being different for each altitude selector. Timing pulses, both for control of the transmitter 5 and for the altitude selectors, are provided by a pulse generator 23.

The outputs of the altitude selectors are applied to cathode ray indicator tubes 25, 27, 29, 31, 33 and 35 respectively. Each of the indicator tubes is provided with a rotatable deflection yoke. The yokes are all connected to a sawtooth wave generator 37 which is controlled by the pulse generator 23. All of the deflection yokes are rotated in synchronism with the antenna 1 by the motor 3.

Television cameras 39, 41, 43, 45, 47 and 49 are provided adjacent the indicator tubes 25, 27, 29, 31, 33 and 35 respectively. The outputs of the cameras are applied to a mixer circuit 51 and broadcast by a television transmitter 53. Synchronizing signals for the scanning circuits of the cameras are provided by a conventional "synch" generator 55. The connections from the generator 55 to the cameras are not shown. The output of the "synch" generator 55 is also applied to the mixer 51 and transmitted by the transmitter 53.

A multivibrator ring oscillator comprising stages 57, 59, 61, 63, 65 and 67, one for each camera, is provided with the output of the last stage 67 connected back to the input of the first stage 57. The output of the last stage also controls a pulse generator 69, whose output goes to the mixer 51 and is transmitted by the transmitter 53. The cameras are normally biassed off so as to provide no output. The output of each multivibrator stage goes to a respective camera. Frame synchronizing pulses from the generator 55 are applied to the multivibrators, synchronizing the ring oscillator to move one step with each frame. Thus the cameras are keyed on in succession, each for the period of one frame, and the pulse generator 69 provides a timing mark at the conclusion of each such sequence.

Although six indicators are shown in Figure 1, it will be understood that a greater number may be used, depending on the number of altitude layers required. In addition to the PPI cameras, two further cameras 71 and 73 are provided for transmitting images of low altitude and high altitude maps 75 and 77 respectively. The cameras 71 and 73 are normally biassed off, and are operated, each for approximately half the time, by keying waves supplied from a trigger circuit 79.

The trigger circuit 79 is of the so-called "flip flop" or Eccles-Jordan type, and is controlled by frame synchronizing signals from the "synch" generator 55. The output of the trigger circuit 79 is applied directly to the camera 73 and through a phase inverter circuit 81 to the camera 71. The outputs of the cameras 71, and 73, as well as those of the "synch" generator 55, go to a mixer 83 and thence to a television transmitter 85, where they are broadcast.

The equipment carried by an aircraft in the practice of the present invention appears in the upper right hand corner of Figure 1, and includes television receivers 87 and 89 responsive to the transmitters 85 and 53 respectively, and a radar beacon comprising a pulse receiver 91 and a pulse transmitter 93.

The output of the pulse receiver 91 is applied to the input circuit of the transmitter 93 through two paths, one including a delay network 95 which provides a fixed amount of delay, and the other including a variable delay network 97. The amount of delay introduced by the network 97 is controlled by an altimeter 99, in accordance with the altitude of the aircraft.

The television receiver 89 is connected to a multivibrator ring oscillator 101, similar to that used at the ground station for keying the PPI cameras. The outputs of the several stages are brought out to a tap switch 103. The kinescope, or picture tube of the receiver 89 is normally biassed off, being keyed on during one frame out of every six by output from the multivibrator ring 101. The particular frame which appears depends upon the position of the switch 103, which is controlled by the altimeter 99.

The receiver 87 is provided with a trigger and phase inverter 105, like those used at the ground station for keying the map cameras 71 and 73. A switch 107 is controlled by the altimeter 99 to key the picture tube of the receiver 87, either directly from the trigger circuit or through the phase inverter, in accordance with the altitude of the craft.

In the operation of the described system, the transmitter 5 is modulated by the pulse generator 23 to produce a continuous train of brief pulses of radio frequency energy, which are radiated by the antenna 1. As the antenna rotates, its beam scans through 360 degrees, so that any aircraft within range will receive a short train of pulses once during each revolution.

The received pulses are demodulated and amplified in the receiver 91 to provide a train of pulses similar to those produced by the pulse generator 23. These are delayed a fixed amount by the network 95, and transmitted by the transmitter 93. In addition, the pulse output of the receiver is delayed in the network 97 by an amount proportional to the altitude of the aircraft, and then transmitted. Thus the transmitter 93 sends out pairs of pulses, the spacing between the two pulses of each pair being a function of the altitude.

The signals transmitted by the transmitter 93 are picked up at the ground station by the antenna 1 and applied to the receiver 7, which produces a corresponding train of double pulses. The receiver output is applied to all of the altitude selector circuits 11, 13, 15, 17, 19 and 21. However, only the one corresponding to the altitude layer of the particular aircraft produces any response, and this response is in the form of a single pulse for each of the double pulses. Assume the craft to be at an altitude such that the selector circuit 15 is operated. The output from this circuit comprises a train of pulses similar to those provided by the generator 23, but delayed with respect thereto by an amount corresponding to the sum of the time required for radiation to travel from the ground station to the aircraft and back to the ground station, and the delays introduced in the system by the altitude coding circuits in the aircraft and the selector circuit at the ground station.

The delayed pulse output of the altitude selector circuit (15 in the present example) is applied to the cathode ray intensity control electrode of the cathode ray tube 29, causing a luminous spot to appear on the screen of the tube 29 at a point corresponding to the position, viewed in plan, of the aircraft with respect to the ground station.

Any other aircraft in the same altitude layer will produce similar indications on the tube 29, at points corresponding to their respective positions. Likewise, aircraft flying in other altitude layers will produce indications on the corresponding cathode ray indicator tubes. The cathode ray tubes 25, 27, 29, 31, 33 and 35 may be provided with long-persistence screens, as is customary with PPI systems, so that the above-described indications or "pips" remain visible during the entire period of rotation of the antenna 1. Alternatively, the storing of the image may be accomplished in the camera tube.

The displays on the several cathode ray tubes are picked up by the television cameras 39, 41, 45, 47 and 49 respectively, and converted to video signals. Owing to keying of the cameras by the multivibrator ring, as described hereinbefore, only one video signal is on at any time, and then only long enough to complete one scanning frame. Thus one complete picture is transmitted by the camera 39, which is then turned off. During the next television scanning period, the camera 41 transmits one complete picture of the face of the tube 27, and so on. Assuming a scanning rate of 30 frames per second, the picture corresponding to any one altitude layer is transmitter five times per second. If ten altitude layers were used instead of the six illustrated, the repetition rate for each layer would be three pictures per second. Although all of the above-described signals sent out by the transmitter 53 are received by the receiver 89, only the pictures corresponding to those appearing on one of the PPI tubes is exhibited, because the switch 103 is adjusted by the altimeter 99 to cut off the receiver except when the picture of the proper altitude layer is being received.

The map channel operates like the PPI channel, except that since only two maps are used, each is transmitted substantially half the time. With a scanning rate of 30 frames per second, each map is transmitted fifteen times per second. Only the signals corresponding to one of the maps appears in the output of the receiver 87, owing to the adjustment of the switch 107 by the altimeter 99. The outputs of both receivers 87 and 89 may be applied to a single cathode ray tube, not shown. The visible display on the aircraft is that of a map which is substantially steady, i. e. approximately constant in intensity, and a superimposed PPI display which flickers at a relatively slow rate. Thus there is no difficulty in distinguishing between the radar derived "pips" indicating the positions of any aircraft in the same altitude layer, and map details, although the entire display is of one color. Moreover, the bandwidth occupied by the television links in the system is only that required to transmit continuously one map and one radar picture, instead of the much greater bandwidth which would be necessary to transmit all the PPI pictures and maps continuously. It will be evident to those skilled in the art that the system may be extended to provide for any desired number of altitude layers, or for more than two maps. Also, a single television link may be employed for both the maps and the PPI pictures, allocating the time by a system such as that described so that map transmissions are interspersed with the PPI transmissions in any desired sequence.

Summarizing briefly, the present invention contemplates a radar-television system wherein radar displays corresponding to a plurality of altitude layers are transmitted by television sequentially, the proper displays being selected on the aircraft. High and low altitude maps are transmitted and selected similarly. The transmissions are multiplexed so that the map displayed on the aircraft appears substantially continuous, while the radar display flickers. This results in economical use of the radio spectrum and improved interpretability of the indications.

Although the invention has been described with reference to a system for transmitting maps and position data, it is contemplated that it may be applied in any situation wherein it is desired to retransmit essentially fixed reference data, and variable data from a plurality of sources for comparison with the reference data.

I claim as my invention:

1. A radio navigation system for aircraft, including a ground station and a plurality of aircraft stations, one on each craft, said ground station including a radio locator system of the plan position indicator type provided with a plurality of indicators, each assigned to one of a plurality of arbitrarily designated altitude layers; each of said aircraft stations including a receiver responsive to signals transmitted by said radio locator, means modifying said signals in accordance with the altitude of the respective craft, and a transmitter for sending said modified signals to said ground station; selector means at said ground station responsive to said modified signals to indicate the position in plan of an aircraft only on the one of said indicators which is assigned to the altitude layer wherein said particular craft is flying; at least two maps at said ground station, said maps showing the area surrounding said ground station, one of said maps showing details of interest to personnel of low flying craft, and the other showing only details of interest to personnel of higher flying craft; television transmitter means at said ground station including a plurality of television cameras, one directed at each of said indicators and one directed at each of said maps, keying means for said cameras to turn on said cameras successively for transmitting television signals representing said indications and said maps respectively on a time-sharing basis cyclically and in succession, said keying means being arranged so that the repetition rate of the transmission of said maps is several times that of the transmission of said indications; television receiver means at each of said aircraft stations, and means keying said receiver means so as to display only the map and only the plan position indication corresponding to the altitude layer within which the respective craft is flying.

2. A radio navigation system for aircraft, including a ground station and a plurality of aircraft stations, one on each craft, said ground station including a radio locator system provided with a plurality of indicator channels, each assigned to one of a plurality of arbitrarily designated altitude layers; each of said aircraft stations including a receiver responsive to signals transmitted by said radio locator, means modifying said signals in accordance with the altitude of the respective craft, and a transmitter for sending said modified signals to said ground station; selector means at said ground station responsive to said modified signals to actuate only the one of said indicator channels which is assigned to the altitude layer wherein said particular craft is flying; at least two maps at said ground station, said maps showing the area surrounding said ground station, one of said maps showing details of interest to personnel of low flying craft, and the other showing only details of interest to personnel of higher flying craft; television transmitter means at said ground station including a plurality of video input channels, one for each of said indicator channels and one for each of said maps, each of said video channels including means producing a video signal representing a respective one of the outputs of said indicator channels and said maps keying means for said video input channels to enable said channels successively for transmitting television signals representing said indications and said maps respectively on a time-sharing basis, cyclically and in succession, said keying means being arranged so that the repetition rate of the transmission of said maps is several times that of the transmission of said indications; television receiver means at each of said aircraft stations, and means keying said receiver means so as to display only the map and only the position indication corresponding to the altitude layer within which the respective craft is flying.

3. In an aircraft navigation system of the type including a ground-based radio locator system having a plurality of plan position indicators, each exhibiting the locations of aircraft within a predetermined altitude layer; at least one map of the area surrounding said radio locator, and a plurality of television cameras, one directed at each of said indicators and one directed at each map, television transmitter means, keying means for selectively and successively supplying the outputs of said cameras to said transmitter means, whereby television signals representing said indications and maps are transmitted sequentially and repeatedly, the repetition rate of the transmission of each plan position indication being a small fraction of the repetition rate of the transmission of each map; television receiver means on board each aircraft which is to use the system, and keying means controlling said television receiver means to exhibit only the plan position indication and only the map corresponding to the altitude layer within which said craft is flying.

4. In an aircraft navigation system of the type including a ground-based radio locator system having a plurality of position indicator channels, each providing signals representing the locations of aircraft within a predetermined altitude layer; at least one map of the surrounding said radio locator, television transmitter means including a plurality of video input channels, one for each of said indicator channels and one for each map, each of said video input channels including means producing a video signal representing a respective one of the outputs of said indicator channels and said maps, keying means for selectively and successively enabling said video channels, whereby television signals representing said indications and maps are transmitted cyclically and in succession, the repetition rate of the transmission of each position indication being a small fraction of the repetition rate of the transmission of each map; television receiver means on board each aircraft which is to use the system, and keying means controlling said television receiver means to exhibit only the position indication and only the map corresponding to the altitude layer within which said craft is flying.

5. A data transmission system including a plurality of sources of variable data, a transmission channel such as a radio link, a keying circuit for applying said data to said transmission channel in a prearranged sequence, means producing and applying to said transmission channel a characteristic signal for identifying the beginning of each such sequence, at least one source of substantially fixed reference data, means transmitting said reference data in a second sequence consistent with said first sequence and at a different repetition rate, means for receiving both said reference data and said variable data, and means for comparing selectively any of said variable data with said reference data.

PHILIP J. HERBST.

REFERENCES CITED

The following references are of record in the file of this patent:

UNITED STATES PATENTS

| Number | Name | Date |
| --- | --- | --- |
| 2,252,083 | Luck | Aug. 12, 1941 |
| 2,253,292 | Goldsmith (1) | Aug. 19, 1941 |
| 2,298,476 | Goldsmith (2) | Oct. 13, 1942 |
| 2,406,751 | Emerson | Sept. 3, 1946 |
| 2,408,848 | Hammond | Oct. 8, 1946 |
| 2,412,669 | Bedford | Dec. 17, 1946 |